United States Patent
Kunisch et al.

(10) Patent No.: US 6,973,180 B1
(45) Date of Patent: Dec. 6, 2005

(54) METHOD FOR PROCESSING TELEPHONE SIGNALS SUPPLIED BY AN ANALOG TELEPHONE TERMINAL AND DATA SUPPLIED BY A DATA TERMINAL

(75) Inventors: Paul Kunisch, Puchheim (DE); Hans-Werner Rudolf, München (DE)

(73) Assignee: Siemens Aktiengesellschaft, Munich (DE)

( * ) Notice: Subject to any disclaimer, the term of this patent is extended or adjusted under 35 U.S.C. 154(b) by 1037 days.

(21) Appl. No.: 09/633,709

(22) Filed: Aug. 7, 2000

Related U.S. Application Data

(63) Continuation of application No. PCT/DE99/00059, filed on Jan. 14, 1999.

(30) Foreign Application Priority Data

Feb. 5, 1998 (DE) .................... 198 04 591

(51) Int. Cl.$^7$ .................... H04M 1/00; H04M 9/00
(52) U.S. Cl. .................... 379/399.01; 379/93.06; 379/93.08; 379/413.02
(58) Field of Search .................... 379/90.01, 93.05, 379/93.06, 93.07, 93.09, 399.01, 402, 413.02, 379/413.03

(56) References Cited

U.S. PATENT DOCUMENTS

| | | | | |
|---|---|---|---|---|
| 4,642,805 A | * | 2/1987 | Dumas et al. | 370/359 |
| 5,671,251 A | * | 9/1997 | Blackwell et al. | 375/222 |
| 5,889,856 A | * | 3/1999 | O'Toole et al. | 379/399.02 |
| 5,943,365 A | * | 8/1999 | Long et al. | 375/222 |
| 6,052,409 A | * | 4/2000 | Quirk et al. | 375/220 |
| 6,341,360 B1 | * | 1/2002 | Abdelilah et al. | 714/704 |
| 6,366,565 B1 | * | 4/2002 | Betts | 370/276 |
| 6,381,267 B1 | * | 4/2002 | Abdelilah et al. | 375/222 |
| 6,389,064 B1 | * | 5/2002 | Dholakia et al. | 375/222 |
| 6,421,320 B1 | * | 7/2002 | Betts | 370/236 |
| 6,487,243 B1 | * | 11/2002 | Hwang et al. | 375/222 |
| 6,505,222 B1 | * | 1/2003 | Davis et al. | 708/323 |
| 6,553,518 B1 | * | 4/2003 | Ware et al. | 714/704 |
| 6,584,078 B1 | * | 6/2003 | Betts | 370/276 |
| 6,661,837 B1 | * | 12/2003 | Abdelilah et al. | 375/227 |
| 6,665,336 B2 | * | 12/2003 | Abdelilah et al. | 375/225 |
| 6,694,015 B1 | * | 2/2004 | Byers et al. | 379/399.01 |
| 6,728,347 B1 | * | 4/2004 | Huschmann et al. | 379/93.09 |
| 6,804,267 B1 | * | 10/2004 | Long et al. | 370/524 |

(Continued)

FOREIGN PATENT DOCUMENTS

EP    0 503 528 A2    9/1992

(Continued)

*Primary Examiner*—Binh K. Tieu
(74) *Attorney, Agent, or Firm*—Laurence A. Greenberg; Werner H. Stemer; Ralph E. Locher

(57) ABSTRACT

A method of handling telephone signals supplied by an analog telephone set and data supplied by a data terminal in a subscriber line circuit of a digital telephone switching system used at least in subregions for data transmission includes directly connecting a telephone set and a data terminal with a modem to the digital telephone switching system through a common analog subscriber line, at least one of subjecting data supplied by the data terminal to a sampling operation at a sampling rate above a sampling rate required for telephone information during analog/digital conversion and coding sampling values representing data supplied by the data terminal according to a linear characteristic during analog/digital conversion, and feeding data originating from and handled by the data terminal directly to a data transmission network. A subscriber line circuit for handling telephone signals supplied by an analog telephone set and data supplied by a data terminal is also provided.

9 Claims, 1 Drawing Sheet

U.S. PATENT DOCUMENTS 6,901,142 B1 * 5/2005 Peters et al. ............ 379/413.02
2002/0191702 A1 * 12/2002 Hoefer ....................... 375/242

FOREIGN PATENT DOCUMENTS

WO　　WO97/50230　　12/1997

* cited by examiner

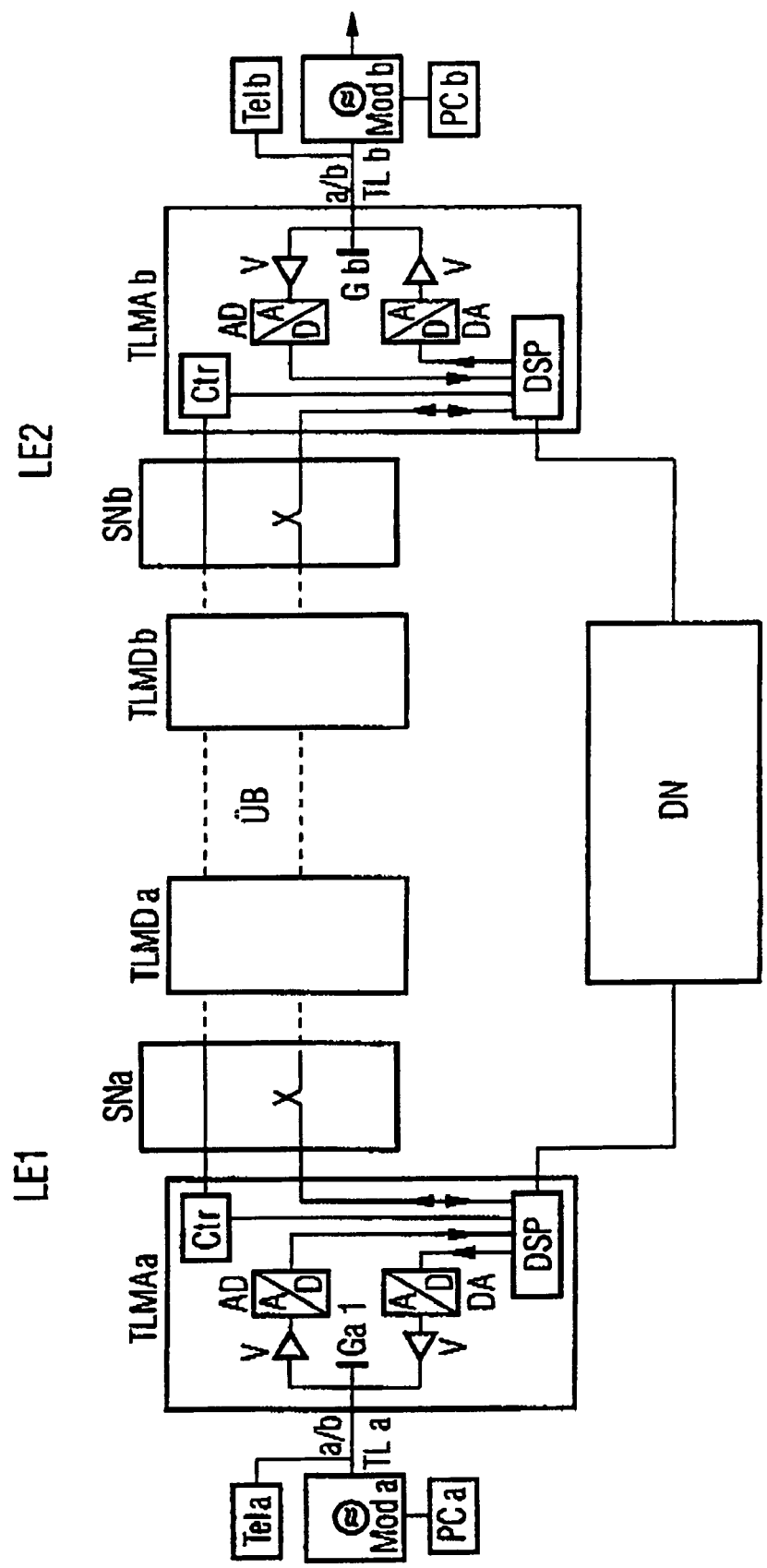

METHOD FOR PROCESSING TELEPHONE SIGNALS SUPPLIED BY AN ANALOG TELEPHONE TERMINAL AND DATA SUPPLIED BY A DATA TERMINAL

CROSS-REFERENCE TO RELATED APPLICATION

This application is a continuation, under 35 U.S.C. § 120, of copending international application No. PCT/DE99/00059, filed Jan. 14, 1999, which designated the United States; this application also claims the priority, under 35 U.S.C. § 119, of German Application No. 198 04 591.3, filed Feb. 5, 1998; the prior applications are herewith-incorporated by reference in their entirety.

BACKGROUND OF THE INVENTION

Field of the Invention

The invention relates to a method of handling telephone signals supplied by an analog telephone set and data supplied by a data terminal in the subscriber line circuit of a digital telephone switching system which is used at least in subregions for a data transmission, to which circuit the telephone set is connected directly and the data terminal is connected with a modem interposed via a common analog subscriber line, characterized in that, during the required analog/digital conversion, at least the data supplied by the data terminal are subjected to a sampling operation at a sampling rate which lies above the sampling rate required for telephone information and/or the sampling values representing data supplied by the data terminal undergo a coding operation according to a linear characteristic, and in that the data originating from the data terminal and handled in such a way are fed directly to a data transmission network (DN).

It accordingly concerns a situation in which an analog subscriber line of a telephone switching system is shared by an analog telephone set and a data terminal, the connection of the data terminal to the subscriber line taking place via a modem. The modem (modulator/demodulator) is a data transmission device which serves the purpose of converting the digital signals supplied by the data terminal into transmissionally advantageous line signals which correspond to the electrical conditions of analog telephone connections or perform a conversion of such signals back into digital signals. In this context, the data are modulated onto carrier signals, different modulation methods being used.

An example of such a type of connected data terminal which comes into consideration is a personal computer (PC).

In the previously known data transmissions of data terminals connected in this way via the telephone network, so-called modem transmissions, the data undergo the same handling in the subscriber line units of the telephone switching system as the voice signals, to be specific a band limitation to less than 4 kHz, an analog/digital conversion and a coding according to a nonlinear characteristic (A-law or p-law), in order to reduce the bit transmission rate according to the limited available transmission bandwidth.

Such handling operations have a restrictive effect on the data transmission, in particular if large amounts of data are to be transmitted, as is the case with modem connections which lead via the modem pool of a network provider to the Internet.

SUMMARY OF THE INVENTION

The object of the invention is therefore to specify for the preconditions mentioned a method of handling telephone signals and data supplied by data terminals in the subscriber line circuit which leads to more favorable conditions, in particular for the data transmission.

Accordingly, during the required analog/digital conversion in the subscriber line circuit, at least the data supplied by the data terminal are subjected to a sampling operation at a sampling rate which lies above the sampling rate required for the telephone information and/or the sampling values representing the data supplied by the data terminal undergo a coding operation according to a linear characteristic. The data originating from the data terminal and handled in such a way are fed directly to a data transmission network.

Consequently, on the one hand it is accepted not to subject the data originating from the data terminal to the same restrictions as the signals originating from the analog telephone set, primarily including the bit rate reduction by application of a nonlinear characteristic, on the other hand a sampling rate corresponding to the needs of the data transmission is used, without regard to the limited transmission band of the telephone transmission paths, since there is no need to regard bandwidth limits on account of the direct transfer of the data via a data transmission network. The two measures in the form of avoiding nonlinear coding and working with a higher sampling rate than is intended for telephone information can in each case be used individually or else in combination.

Further refinements of the invention are characterized in subclaims.

According to a first refinement of the method according to the invention, for the transmission on the subscriber line, the data signals supplied by the data terminals are modulated onto a carrier signal, the frequency of which lies above the frequency band authorized for the transmission of telephone signals. This dispels the restrictions which have previously existed for the frequency of the carrier signal on the upper limit maintained with regard to the voice band limitation.

A further refinement of the invention takes the form of a subscriber line circuit which is designed with regard to the implementation of the method according to the invention and in this context comprises an analog/digital converter and digital/analog converter, used both for the voice signals and for the data signals, and a signal processor which is connected on the digital side of said converter and represents the digital interface with respect to the switching matrix of the telephone exchange on the one hand and the data network on the other hand.

The invention is explained in more detail below on the basis of an exemplary embodiment with reference to a FIGURE.

BRIEF DESCRIPTION OF THE DRAWINGS

The FIGURE shows to the extent required for explaining the invention the component parts of two telephone exchanges LE1 and LE2, between which a transmission link ÜB exists, as well as a data transmission network DN as a block.

DESCRIPTION OF THE PREFERRED EMBODIMENT

The modem communication of a data terminal which is connected to the telephone exchange LE1 with a data terminal which is connected to the telephone exchange LE2 is explained. These data terminals may be, for example, the personal computers PCa and PCb. These are connected in each case via a modem Moda and Modb, respectively, to an analog subscriber line TLa and TLb, respectively, by which a connection is established with the subscriber line circuit TLMAa of the exchange LE1 or TLMAb of the exchange LE2. These subscriber lines TLa, TLb serve also and primarily for the connection of a telephone set Tela or Telb to said subscriber line circuits.

Parts of interest here of the subscriber line circuits are a hybrid circuit Ga or Gb for the two-wire/four-wire transmission from the subscriber line to the four-wire transmission branches of the exchange, amplifiers V lying in these four-wire branches and an analog/digital converter AD in the transmitting branch and a digital/analog converter DA in the receiving branch. A digital signal processor DSP, to which the output signals of the analog/digital converter AD are fed, and which leads digital signals to the digital/analog converter DA, is a further component part. On the exchange side, the digital signal processor DSP is on the one hand in connection with the switching matrix SNa or SNb of the telephone exchange concerned, on the other hand it forms an interface with respect to a data network DN, for example an ATM network or the Ethernet.

Also represented as a component part of the subscriber line circuits is a controller CTR, which controls the digital signal processor DSP and supplies signaling information for the establishment of telephone connections, in which context it communicates with the corresponding controller of the exchange of the calling subscriber via a signaling connection existing between the two exchanges.

The subscriber link ÜB between the two exchanges LE1 and LE2 is connected via line circuits TLMDa or TLMDb to the switching matrices of these exchanges.

In a connection of the data terminal PCa to the data terminal PCb, the digital data supplied by these data terminals are converted in the modem Moda or Modb into analog signals and modulated onto a carrier wave for the transmission on the subscriber line TLa. In previous modem connections, in which the handling of the data signals in the devices of the telephone exchange and on the transmission path underwent the same handling as voice information of the telephone traffic, this carrier frequency had, with regard to the limited transmission bandwidth for voice information of 3 kHz, a frequency of, for example, 2.6 kHz. In the subscriber line circuit TLMDa, these data, transmitted in the form of analog signals, are subjected to an analog/digital conversion by the analog/digital converter ADA. The sampling rate of previous analog/digital converters was 8 ksamples/s, whereby, after a compression corresponding to a nonlinear characteristic into a code representation using 8 bits per code word, the standard transmission bit rate of 64 k bits/s for telephone connections was maintained.

According to the invention, however, a sampling of the analog signals corresponding to data supplied by the data terminal at a sampling rate lying significantly above the sampling rate for voice information, to be specific for example at 64 ksamples/s, now takes place in the analog/ digital conversion. The coding of the digital signals in this case takes place according to a linear characteristic with, for example, 16 bits. These digital signals are fed via the digital signal processor to the data network DN, in which a data transmission can take place under the preconditions mentioned at a transmission rate of approximately 1 Mbit/s.

The measures mentioned here for the handling of the data originating from the data terminals, to be specific the sampling at a higher sampling rate and the avoidance of the compression intended for the voice signal information, can also be used as an alternative if lower data transmission rates are adequate.

Since the analog/digital conversion of the voice information takes place in practice with the same analog/digital converter ADA, the corresponding digital signals are processed in the digital signal processor in such a way that they correspond to the unchanged and internationally standardized transmission conditions for telephone signal transmission, i.e. are reduced to 8000 sampling values per second and are compressed according to a nonlinear characteristic to a code representation of code words comprising 8 bits. On the other side, i.e. in the subscriber circuit TLMAb and the modem Modb, corresponding processes take place.

For the analog/digital conversion, essentially any desired converter principles come into consideration, just as long as they allow the high sampling rates in the form of a multiple of 8000 sampling values per second and the representation of the digital signals as code words with more than 8 bits. Particularly suitable in this context, however, is a so-called sigma/delta converter, which operates at a very high sampling rate (10 MHz), but uses only one or two bits for the digital signal representation. With the aid of the digital signal processor, in this case a decimation to a lower number of sampling values and a change of the code representation to code words of, for example, 16 bits is achieved.

If conventional hardware is still being used on the other side of a modem connection, it is of course also possible when using the subscriber circuit described to continue with the data transmission over the telephone network, for which purpose the digital signal processor DSP processes the digital signals supplied by the analog/digital converter according to the low transmission bandwidth and transmission bit rate, as a result of which, however, the advantages offered by the novel analog/digital converter are not utilized.

We claim:

1. A method of handling telephone signals supplied by an analog telephone set and data supplied by a data terminal in the subscriber line circuit of a digital telephone switching system used at least in subregions for data transmission, which comprises:
    connecting a telephone set and a data terminal to a subscriber line circuit of a digital telephone switching system through a common analog subscriber line;
    subjecting data outgoing to the digital telephone switching system to an analog/digital conversion at a sampling rate above a sampling rate required for telephone information such that the data originating from the data terminal is not subject to the same restrictions as the signals originating from the analog telephone set; and
    according to a digital coding to analog conversion, data incoming from the digital telephone switching system using a linear characteristic; and feeding data originating from and handled by the data terminal directly to a data transmission network.

2. The method according to claim 1, which further comprises modulating data signals supplied for transmission on the subscriber line at a frequency above a frequency band authorized for transmission of telephone signals.

3. The method of handling telephone signals according to claim 1, which further comprises using a linear analog/ digital conversion characteristic such that the data originating from the data terminal is not subject to the same restrictions as the signals originating from the analog telephone set.

4. A subscriber line circuit for handling telephone signals supplied by an analog telephone set and data supplied by a data terminal in a subscriber line circuit of a digital telephone switching system used at least in subregions for data transmission, comprising:
- a telephone set for producing telephone signals;
- a data terminal having a modem for producing data signals;
- an analog subscriber line, said telephone set (Tela, Telb) and said data terminal directly connected to a subscriber line circuit of a digital telephone switching system through said analog subscriber line;
- an analog/digital converter having a sampling rate above a sampling rate required for telephone information, said analog/digital converter:
  - connected to said telephone set and said data terminal;
  - receiving said telephone signals and said data signals; and
  - producing digital signals according to the sampling rate such that the data originating from the data terminal is not subject to the same restrictions as the signals originating from the analog telephone set; and
- a digital signal processor reducing signals incoming from the digital telephone switching system to a transmission bit rate for telephone transmission and simultaneously coding said telephone signals according to a nonlinear characteristic.

5. The subscriber line circuit according to claim 4, wherein said digital signal processor emits digital signals, and including:
- a data network; and
- a digital interface connected to said digital signal processor, said digital interface:
  - conveying digital signals representing data signals emitted by said digital signal processor to said data network; and
  - conveying to said digital signal processor digital signals coming from said data network intended for said data terminal.

6. The subscriber line circuit according to claim 4, wherein the digital signals use a linear analog/digital conversion characteristic such that the data originating from the data terminal is not subject to the same restrictions as the signals originating from the analog telephone set.

7. In a digital telephone switching system used at least in subregions for data transmission, a subscriber line circuit, comprising:
- a telephone set for producing telephone signals;
- a data terminal having a modem for producing data signals;
- an analog subscriber line, said telephone set and said data terminal directly connected to the digital telephone switching system through said analog subscriber line;
- an analog/digital converter having a sampling rate above a sampling rate required for telephone information, said analog/digital converter:
  - connected to said telephone set and said data terminal;
  - receiving said telephone signals and said data signals; and
  - producing digital signals; and
- a digital signal processor reducing signals incoming from the digital telephone switching system to a transmission bit rate for telephone transmission and simultaneously coding said telephone signals according to a nonlinear characteristic such that the data originating from the data terminal is not subject to the same restrictions as the signals originating from the analog telephone set.

8. The subscriber line circuit according to claim 7, wherein said digital signal processor emits digital signals, and including:
- a data network; and
- a digital interface connected to said digital signal processor, said digital interface:
  - conveying digital signals representing data signals emitted by said digital signal processor to said data network; and
  - conveying to said digital signal processor digital signals coming from said data network intended for said data terminal.

9. The digital telephone switching system according to claim 7, wherein the telephone signals are coded also using a linear characteristic for the data originating from the data terminal such that the data originating from the data terminal is not subject to the same restrictions as the signals originating from the analog telephone set.

\* \* \* \* \*